INVENTORS
GEORGE TUNGETT
TRAVIS R. HELMS
ORVAL MORRIS
ATTORNEYS

Patented Jan. 10, 1950

2,494,526

UNITED STATES PATENT OFFICE 2,494,526

TOWING DEVICE

George Tungett, Travis R. Helms, and Orval Morris, Grand Rapids, Mich., assignors to Helms Industrial Development Company, Grand Rapids, Mich., a corporation of Michigan Application May 17, 1948, Serial No. 27,586

2 Claims. (Cl. 280—33.14)

This invention relates to a novel, simple and economical towing device by which one motor vehicle may pull or tow another, the device being connected at opposite ends, respectively, to the rear and front bumpers of the car which is doing the towing and the one which is being towed.

With our invention, it is an object and purpose to produce a towing device of the character stated which includes two bumper engaging clamps, one at each end of a cable of a selected length. The clamps are made of duplicate parts, two of said parts being used with each of the clamps, so that in manufacture only two elements require fabrication. Four of such elements which make up the two clamps are identical and the remaining element consists preferably of a wire rope or cable, at the opposite ends of which the clamps are located and connected.

Figure 1:
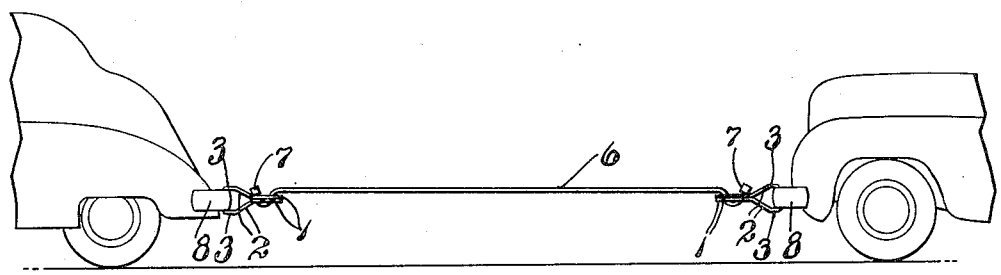
Figure 2:
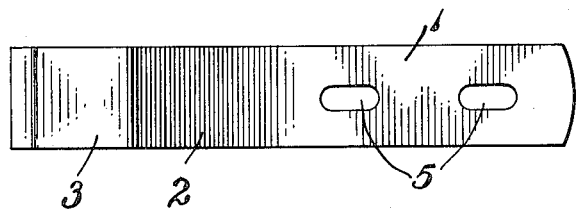
Figure 3:
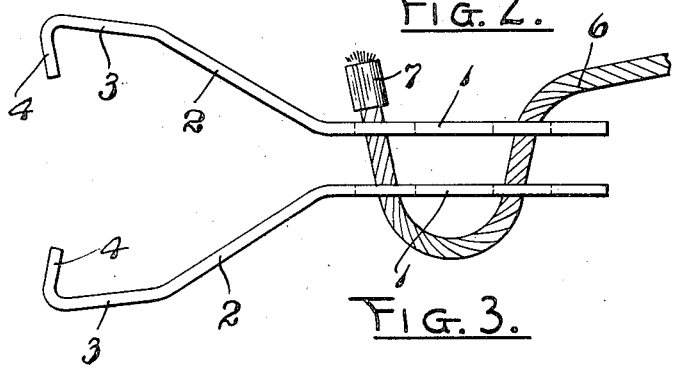
Figure 4:
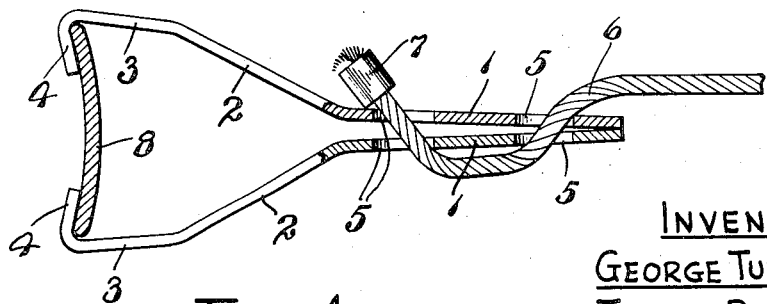

An understanding of the invention may be had from the following description, taken in connection with the accompanying drawing, in which Fig. 1 is an elevation showing the towing appliance in use with one automobile towing another, Fig. 2 is a plan view of one of the clamping elements, two of which are used for each of the clamps at opposite ends of the towing cable, Fig. 3 is a side elevation of the towing appliance at one end thereof, the clamping members being separated as they are when about to be applied to an automobile bumper and the cable slackened to permit such separation, and Fig. 4 is a similar elevation, with parts in vertical section, showing the clamp attached to a bumper and with the cable tightened to bring the two parts of the clamp together.

Like reference characters refer to like parts in the different figures of the drawing.

The towing appliance consists of a clamp at each end of a towing rope or cable. Each of the clamps is made of two flat metal members. Each member has a horizontal section 1 at one end portion where the towing rope will be connected, from which a section 2 diverges outwardly at an angle to the section 1, continuing in a third section 3 which, when the clamp is applied to a bumper, is in a generally horizontal position, and terminates in a hook 4. Each of the sections 1, first described, has two relatively short slots 5 therethrough spaced from each other and located substantially along the longitudinal center line of the clamp member.

The cable 6, which is preferably a twisted wire cable, is attached to the two clamping members which are used at each end of the cable, by threading the cable through the slots 5 nearest the ends of the sections 1 of the two clamping members and thence bending it back underneath and passing it upwardly through the inner slots 5. A sleeve 7, preferably of metal, is securely connected at each end of the cable.

The clamp as thus attached, one at each end of the cable, has the two sections 1 in general parallel relation to each other, with the sections 2 diverging outwardly from each other and with the hooks 4 extending toward each other and separated as shown in Fig. 3. With the cable slack as shown in such figure, the parallel end sections 1 may be separated a distance from each other so as to separate the hooks 4 to permit them to connect with the upper and lower edge portions, respectively, of an automobile bumper 8. The upper hook 4 extends downwardly at the inner face of the bumper and the lower hook 4 upwardly, the clamping members passing around the upper and lower edges of the bumper at the bends between the sections 3 and the hooks 4. When thus connected the generally parallel horizontal sections 1 are brought toward each other and the cable pulled through the slots 5 so that the clamps connect with the bumpers, one at the rear end of a towing car and the other at the front end of the car which is towed, as shown in Fig. 1.

The pull put upon the cable 6 has the effect of forcing said sections 1 of the two members of each of the clamps farther toward each other and more firmly connecting the hooks with the bumpers. The cable of twisted wire is relatively stiff and there is a strong binding or biting engagement between the cable and the outer end of the outermost slot 5 of the upper clamping member and at the opposite end of the slot 5 immediately below in the lower clamping member. Also at the outer end of the inner slot 5 in the lower clamping member the cable has the same engagement so that the pull exerted on the cable is taken in large part by such engagement of the cable as described, and undue force is not exerted upon the sleeve 7 which would tend to pull it loose from the cable at each end thereof where located.

The structure is very practical and effective, and because of its simplicity of structure and duplication of the four parts which make up the two clamps, is very economical to produce.

The invention is defined in the appended claims and is to be considered comprehensive of all forms of structure coming within their scope.

We claim:

1. In a structure as described, a pair of clamp members of flat metal each having two end sections adapted to be located substantially parallel to each other and one over the other, and said clamp members having diverging sections extending from said end sections terminating in hook portions extending toward each other, each of said end sections having two spaced openings in the length thereof, said openings in the two end sections being in conjunction with each other, a cable having an end portion extending through said openings in the end sections nearest the ends thereof, thence through the other openings therein, and a stop member connected at the end of the cable to bear against a clamp member adjacent the inner end of the inner opening therein.

2. In a structure of the class described, a flexible cable and a clamp at each end of the cable, each clamp comprising two members having, each an end section, said end sections being located one over the other, and a section extending at an angle thereto and terminating in an inturned hook, the hooks of said members extending toward each other, said first mentioned end sections having each two spaced openings therethrough through which the associated end portion of the cable passes extending downwardly through the outermost of the end openings of end sections, and thence upwardly through the other of said openings, a stop member located around and permanently secured to the cable at each end, said stop member at each end of the cable comprising a sleeve of metal, a lower corner edge of which is adapted to contact with and engage against the upper of said clamp members connected at the associated end of the cable, adjacent the inner side of the inner opening in said upper clamp member.

GEORGE TUNGETT.
TRAVIS R. HELMS.
ORVAL MORRIS.

REFERENCES CITED

The following references are of record in the file of this patent:

UNITED STATES PATENTS

| Number | Name | Date |
|---|---|---|
| 1,087,012 | Heberling | Feb. 10, 1914 |
| 2,435,813 | Williams | Feb. 10, 1948 |
| 2,448,311 | Hill | Aug. 31, 1948 |
| 2,455,140 | Roth | Nov. 30, 1948 |